US010619121B2

(12) United States Patent
Turner et al.

(10) Patent No.: US 10,619,121 B2
(45) Date of Patent: Apr. 14, 2020

(54) CANDLE WAX COMPOSITION AND METHOD OF MAKING

(71) Applicant: ExxonMobil Research and Engineering Company, Annandale, NJ (US)

(72) Inventors: Elizabeth A. Turner, Sarnia (CA); Federica Portoghese, Calgary (CA); Alan G. Blahey, Sarnia (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 273 days.

(21) Appl. No.: 15/443,326

(22) Filed: Feb. 27, 2017

(65) Prior Publication Data

US 2017/0247634 A1 Aug. 31, 2017

Related U.S. Application Data

(60) Provisional application No. 62/300,120, filed on Feb. 26, 2016.

(51) Int. Cl.
*C11C 5/00* (2006.01)
*F23D 3/16* (2006.01)
*B27N 7/00* (2006.01)
*C09D 191/06* (2006.01)
*C09D 191/08* (2006.01)

(52) U.S. Cl.
CPC .............. *C11C 5/002* (2013.01); *B27N 7/005* (2013.01); *C09D 191/06* (2013.01); *C09D 191/08* (2013.01); *C11C 5/004* (2013.01); *F23D 3/16* (2013.01)

(58) Field of Classification Search
CPC ................................ C11C 5/002; C11C 5/008
USPC .................................... 431/289, 291; 44/275
See application file for complete search history.

(56) References Cited

U.S. PATENT DOCUMENTS

| | | | |
|---|---|---|---|
| 3,046,101 A * | 7/1962 | Tench | C08L 91/08 208/21 |
| 4,118,203 A | 10/1978 | Beardmore et al. | |
| 4,375,973 A * | 3/1983 | Rossi | C10L 1/143 44/394 |
| 4,855,098 A | 8/1989 | Taylor | |
| 4,965,305 A * | 10/1990 | Jones | C08L 91/08 524/349 |
| 5,578,089 A | 11/1996 | Elsamaloty | |
| 5,879,694 A | 3/1999 | Morrison et al. | |
| 5,961,709 A * | 10/1999 | Hayner | C08L 95/00 106/279 |
| 6,001,286 A | 12/1999 | Sleeter | |
| 6,019,804 A | 2/2000 | Requejo et al. | |
| 6,063,144 A | 5/2000 | Calzada et al. | |
| 6,096,102 A | 8/2000 | Matthai et al. | |
| 6,096,189 A * | 8/2000 | Cody | C10G 65/04 208/18 |
| 6,099,719 A * | 8/2000 | Cody | C10G 65/04 208/57 |
| 6,159,254 A * | 12/2000 | Akiyama | C08K 5/01 44/268 |
| 6,183,849 B1 | 2/2001 | Lindsay et al. | |
| 6,214,918 B1 | 4/2001 | Johnson et al. | |
| 6,221,115 B1 | 4/2001 | Hyun et al. | |
| 6,262,153 B1 | 7/2001 | Webster et al. | |
| 6,277,310 B1 | 8/2001 | Sleeter | |
| 6,284,007 B1 | 9/2001 | Tao | |
| 6,296,674 B1 | 10/2001 | Trainor et al. | |
| 6,440,184 B2 | 8/2002 | Noda et al. | |
| 6,471,731 B1 | 10/2002 | Elliott, III et al. | |
| 6,497,735 B2 | 12/2002 | Tao | |
| 6,503,285 B1 | 1/2003 | Murphy | |
| 6,534,573 B1 * | 3/2003 | Mace | C08L 91/06 524/275 |
| 6,540,795 B2 | 4/2003 | Wood et al. | |
| 6,544,304 B2 | 4/2003 | Wood et al. | |
| 6,544,305 B2 | 4/2003 | Wood et al. | |

(Continued)

FOREIGN PATENT DOCUMENTS

| | | |
|---|---|---|
| CA | 2431792 A1 | 6/2003 |
| CN | 1182783 A | 5/1998 |

(Continued)

OTHER PUBLICATIONS

Carll, Review of Thickness Swell in Hardboard Siding-Effect of Processing Variables, Gen. Tech. Rep. FPL-GTR-96, Jan. 1997, U.S. Department of Agriculture, Forest Service, Forest Products Laboratory, Madison, WI.

Hsu, et al. Water Repellent Efficacy of Wax Used in Hardboard, Ind. Eng. Chem. Res., vol. 27, No. 7, 1988, American Chemical Society, Philadelphia, PA.

Maloney, Structural materials, binders and other additives, and special considerations, Seventeenth International Particleboard/ Composite Materials Series Symposium held at Washington State University, Letters to the Editor, Wood Sci. Technol. 18:157-160, Springer-Verlag 1984, Berlin, Germany.

Meyer, Interactions between Chain Length Distributions, Crystallization behaviour and Needle Penetration of Paraffin Waxes, Erdol-Erdgas-Kohle-Journal, Jan. 2006, Hamburg, Germany.

(Continued)

*Primary Examiner* — Avinash A Savani
*Assistant Examiner* — Aaron H Heyamoto
(74) *Attorney, Agent, or Firm* — Robert A. Migliorini; Scott F. Yarnell

(57) ABSTRACT

Wax compositions are provided with improved properties for candles and candle jars. The candle wax composition includes a major amount of a foots oil and minor amount of a 600N slack wax. In one form, the foots oil is a 150N foots oil that is included in the composition at from 70 to 80 weight % of the composition and the 600N slack wax is included in the composition at from 20 to 30 wt % of the composition. The candle wax composition provides substantially no oil bleed and a smooth surface appearance with improved burning properties in terms of soot production, wax consumption, melt pool depth and flame height.

15 Claims, No Drawings

(56) References Cited

U.S. PATENT DOCUMENTS

| | | | |
|---|---|---|---|
| 6,547,840 | B2 | 4/2003 | Wood et al. |
| 6,562,083 | B2 | 5/2003 | Wood et al. |
| 6,562,084 | B2 | 5/2003 | Wood et al. |
| 6,562,085 | B1 | 5/2003 | Wood et al. |
| 6,599,334 | B1 | 7/2003 | Anderson |
| 6,656,235 | B2 | 12/2003 | An |
| 6,667,403 | B2 | 12/2003 | Wood et al. |
| 6,740,132 | B2 | 5/2004 | Wood et al. |
| 6,770,104 | B2 | 8/2004 | Murphy |
| 6,773,469 | B2 | 8/2004 | Murphy |
| 6,797,020 | B2 | 9/2004 | Murphy |
| 6,830,614 | B2 | 12/2004 | Hudson et al. |
| 6,905,525 | B2 | 6/2005 | Wood et al. |
| 7,018,432 | B2 | 3/2006 | Moussouni |
| 7,220,288 | B2 | 5/2007 | D'Amico et al. |
| 7,445,648 | B2 | 11/2008 | Hudson et al. |
| 7,462,205 | B2 | 12/2008 | Murphy |
| 7,588,607 | B1 | 9/2009 | Cap |
| 7,637,968 | B2 | 12/2009 | Murphy |
| 7,731,767 | B2 | 6/2010 | Tao |
| 7,846,372 | B1 | 12/2010 | Njus et al. |
| 8,071,209 | B2 | 12/2011 | Theberge et al. |
| 8,076,006 | B2 | 12/2011 | Wantling |
| 8,231,763 | B2 | 7/2012 | Buchholz et al. |
| 8,343,634 | B2 | 1/2013 | Wantling et al. |
| 8,476,345 | B2 | 7/2013 | Buchholz |
| 8,652,633 | B2 | 2/2014 | Buchholz |
| 8,748,516 | B2 | 6/2014 | Winterowd et al. |
| 2003/0046860 | A1 | 3/2003 | Tiffany et al. |
| 2003/0091949 | A1* | 5/2003 | Pesu ................ C10L 5/44 431/288 |
| 2003/0110683 | A1 | 6/2003 | Murphy |
| 2003/0148239 | A1 | 8/2003 | Szczerba et al. |
| 2004/0088908 | A1 | 5/2004 | Murphy |
| 2004/0139885 | A1* | 7/2004 | Hudson ............... C09D 191/08 106/270 |
| 2004/0221504 | A1 | 11/2004 | Murphy |
| 2005/0060927 | A1 | 3/2005 | Murphy |
| 2007/0006522 | A1 | 1/2007 | Tao |
| 2007/0026352 | A1 | 2/2007 | Kubicek et al. |
| 2007/0094916 | A1 | 5/2007 | Burkhamer et al. |
| 2007/0094917 | A1 | 5/2007 | Burkhamer et al. |
| 2007/0184395 | A1* | 8/2007 | Taylor ................. F23D 3/16 431/33 |
| 2007/0256352 | A1 | 11/2007 | Wood et al. |
| 2007/0261337 | A1* | 11/2007 | Whitaker ........... C04B 20/1018 52/300 |
| 2007/0282000 | A1 | 12/2007 | Murphy et al. |
| 2008/0145808 | A1 | 6/2008 | Lee |
| 2009/0217568 | A1 | 9/2009 | Murphy et al. |
| 2010/0205851 | A1 | 8/2010 | Uptain et al. |
| 2010/0215956 | A1* | 8/2010 | Buchholz ............. B27N 1/006 428/375 |
| 2010/0299989 | A1 | 12/2010 | Tao et al. |
| 2014/0170578 | A1* | 6/2014 | Leach ................. C11C 5/004 431/289 |
| 2016/0222251 | A1* | 8/2016 | Agrawal ............... C08J 7/047 |
| 2019/0031972 | A1* | 1/2019 | Hoch ................. C10L 5/146 |

FOREIGN PATENT DOCUMENTS

| | | |
|---|---|---|
| CN | 1478876 A | 3/2004 |
| CN | 200971351 Y | 11/2007 |
| CN | 101463290 A | 6/2009 |
| DE | 19644737 A1 | 7/1997 |
| DE | 10035481 A1 | 4/2001 |
| DE | 102008044107 A1 | 6/2010 |
| EP | 1252227 B1 | 9/2004 |
| EP | 1616935 A1 | 1/2006 |
| EP | 1776868 A1 | 4/2007 |
| EP | 1776869 A1 | 4/2007 |
| EP | 1390460 B1 | 8/2010 |
| FR | 2686894 A | 7/1993 |
| FR | 2847261 B1 | 5/2004 |
| GB | 2429017 A | 9/2006 |
| JP | 2002212590 A | 7/2002 |
| WO | 9924233 A1 | 5/1999 |
| WO | 0060012 A1 | 10/2000 |
| WO | 00119609 A1 | 3/2001 |
| WO | 0157125 A1 | 8/2001 |
| WO | 0157126 A1 | 8/2001 |
| WO | 02079313 A1 | 10/2002 |
| WO | 02079314 A1 | 10/2002 |
| WO | 02092736 A1 | 11/2002 |
| WO | 02098968 A1 | 12/2002 |
| WO | 2004015045 A2 | 2/2004 |
| WO | 2004046286 A1 | 6/2004 |
| WO | 2005042682 A1 | 5/2005 |
| WO | 2006076364 A3 | 7/2006 |
| WO | 2008151064 A1 | 12/2008 |
| WO | 2008157436 A1 | 12/2008 |
| WO | 2009128069 A1 | 10/2009 |
| WO | 2016032702 A1 | 3/2016 |
| WO | 2016111865 A1 | 7/2016 |
| WO | 2016144761 A1 | 9/2016 |

OTHER PUBLICATIONS

Roffael, For waterproofing medium density fiberboard with paraffins part 1: influence of the chemical composition of the paraffin and the type of emulsifier on the waterproofing of MDF, Wood as raw materials and composites, Apr. 2005, 63, Springer-Verlag, Berlin, Germany.

Roffael, Paraffin Sizing of Particleboards: Chemical Aspects, Proceedings of the Seventeenth Washington State University International Particleboard/Composite Materials Series, Mar. 1983, Pullman, Washington.

Young, Practical Applications of Gas Chromatography in the Paint and Coatings Industry, Analysis of Paints and Related Materials; Current Techniques for Solving Coating Problems, ASTM STP 1119, American Society for Testing and Materials, 1992, Philadelphia, Pennsylvania.

The International Search Report and Written Opinion of PCT/US2017/017784 dated May 11, 2017.

* cited by examiner

CANDLE WAX COMPOSITION AND METHOD OF MAKING

CROSS-REFERENCE TO RELATED APPLICATIONS

This application claims priority to U.S. Provisional Application Ser. No. 62/300,120 filed Feb. 26, 2016, which is herein incorporated by reference in its entirety.

FIELD

The present disclosure relates to wax formulations for use in candles. More particularly, the present disclosure relates to wax formulations that demonstrate improved oil bleed, a smooth exterior finish, low sooting and no wax tunneling when used in candles.

BACKGROUND

Although candles have been produced for millennia, certain problems in candle production still remain. Specifically, candle producers desire candle waxes that demonstrate little or no shrinkage, little or no oil bleed, a smooth exterior finish, a pleasing and stable appearance, low sooting, no wax tunneling and the ability to retain fragrance. Candles are traditionally made of petroleum derived waxes with mostly normal paraffin (n-paraffin) content, lower molecular weights, and therefore lower melting points. While candles with high n-paraffin content retain the proper color and texture desired by candle makers, they are often plagued by excessive shrinkage and poor fragrance retention.

While all of the above properties are important to candle makers, the most important property is the melting point of the wax. Candle makers use Fully Refined Waxes ("FRW"), which usually have less than 1% oil content, as the largest, if not only, wax type in their candles. On occasion, candle makers add microwax or polymers, to enhance the candle's properties, but these additives are costly relative to the wax. Low Melting ("LM") point wax usually melts at 128° F. (53° C.) or less. Waxes of this type are typically used for container candles, i.e., religious novena candles and decorative, fragranced jar candles. Typically LM FRW is gray in appearance and demonstrate relatively high shrinkage. Mid Melting ("MM") point waxes usually melt between 128 and 145° F. (53-63° C.) and are often used for higher quality container candles and free standing candles. MM RHC™ FRW are gray in appearance and demonstrate only slightly less shrinkage than LM FRW.

High Melting ("HM") point waxes, melting at greater than 145° F. (63° C.), are not commonly used in the candle industry. While waxes of this type typically demonstrate less shrinkage than either LM or MM RHC™ waxes, other significant disadvantages have prevented their use in the candle industry. HM FRW waxes are not used as candles because they exhibit a "tunneling" effect. That is, the candle burns straight down into the candle, leaving walled sides. The tunneling effect has proven highly commercially unattractive for both jar and stand-alone candles. The tunneling effect is caused because the "pool" of liquid wax that forms on the top surface of a burning candle does not extend far from the flame, due to the high melting point of the wax. Thus, the candle tends to be consumed unevenly, carving out a cylinder in the center of the candle. A solution to this problem would be to use a larger wick, but this produces a larger and higher flame—again a commercially unattractive option.

Shrinkage is a common problem experienced in candle manufacture. As a molten candle wax solidifies, the volume shrinks. In some cases this shrinkage can be beneficial, for example in helping a poured candle pull away from the sides of a mold making it easier to remove. However, wax shrinkage usually produces an unwanted concave effect on the top of the candle. Candle manufacturers must often re-melt the top portion of the candle or even resort to a second pouring of the candle wax formulation to level the top should excess shrinkage occur. In container candles, shrinkage can lead to candle separation from the side of the container—another undesired effect. Shrinkage has been directly linked to the amount of n-paraffin in the candle wax. Candle waxes containing about 100% n-paraffin will shrink approximately 12 to 15% by volume on cooling. Candle waxes containing about 75% n-paraffin will shrink approximately 8 to 12% by volume on cooling. Candle waxes containing about 50% n-paraffin will shrink approximately 6 to 8% by volume on cooling.

Several methods have been developed in an effort to control excessive shrinkage in container candles. Typically shrinkage is controlled by introducing components that will disrupt the n-paraffin crystal formation. Historically, the addition of high molecular weight isoparaffins (in the form of microwax or petrolatum), oxygenated molecules (such as carboxylic acids, carboxylate esters) and polyol structures have helped control shrinkage. However, these solutions are usually costly, can alter the color and texture of the candle, and, in some cases, raise the melting point to an unacceptably high level.

Another significant concern for candle makers is oil bleed. Oil bleed can be defined as the migration of oil or oil-type molecules out of and onto the surface of the solid wax. The appearance of oil on the wax candle surface is generally regarded as an unacceptable appearance phenomenon. The oil can be derived from the natural oil content of the petroleum wax or from added oily components in the candle formulation, including fragrance oils and carrier solvents for fragrance packages. Petroleum waxes of all types contain some amount of oil. Fully refined waxes have typically less than 1%, more often less than 0.5%, oil content (as measured by the ASTM D-721 test method). Scale waxes are low oil content slack waxes. With further refinement to improve color and odor, typically by hydrotreatment, scale waxes can be upgraded to semi-refined waxes that can have from 1% to about 5% oil content (as measured by the ASTM D-721 test method). Semi-refined waxes have found limited use in container candles, in spite of their typically lower cost, because of a greater tendency to exhibit oil bleed in a formulated candle.

Historically, methods for improving oil bleed or fragrance hold in candle manufacture include: 1. addition of high molecular weight microwax (derived from bright stock), 2. addition of petrolatum (petroleum jelly), 3. addition of other additives, and 4. rigorous control of process conditions, such as cooling rates and sequences.

While helping to minimize oil bleed, the addition of microwax and modified waxes often causes additional problems of shrinkage (see above). The addition of petrolatum or petroleum jelly is relatively expensive and significantly softens the candle. Other additives can also be expensive and/or can negatively alter the appearance and shrinkage characteristics of the wax and candle formulation. Finally, varying the cooling rates and sequences is labor intensive and often varies with the slightest difference in the underlying candle wax.

Another important attribute for candle manufacturers is the color and uniformity of the raw candle. The impact of raw wax color and appearance on the final candle formulation can be significant. For example, a translucent gray LM fully refined wax will provide a different appearance in a given candle formulation than higher melting, more isoparaffinic wax that has a more cloudy, white-gray appearance. Candle makers typically formulate for a given type of base wax and strive to maintain a consistent color and appearance for each candle formulation. A wax that exhibits a rich, creamy opaque whiteness can provide the candle maker with new and improved options for candle formulation. In terms of appearance, having a smooth exterior finish of the candle is also needed.

A growing number of Group I refineries are closing as demand increases for Group II and Group III lubricant base stocks. As a consequence, the volume of paraffinic wax available in the marketplace is diminishing. To compensate for this loss in volume candle wax customers are utilizing alternative wax sources to meet their needs. Hence there is a need for new wax compositions for candles that would increase the overall wax volume by using stranded or underutilized wax streams.

As discussed above, Group I refineries are being converted to Group II and Group III refineries, which has resulting in a decrease in wax sources for candle jar wax. As such, there exists a need to find other suitable wax sources for candle jar wax formulations that yield acceptable properties. In addition, there is a need for a wax formulation that yields a smooth candle finish because in recent years, the candle industry has expressed a growing interest in a smooth candle wax as the industry moves away from non-smooth (mottled) candles.

SUMMARY

Presently described are candle wax compositions and methods for making and using the same to improve the performance characteristics of candles and candle jars. It was surprisingly and unexpectedly discovered that the individual components (foot oils and slack wax) used in the candle wax compositions disclosed herein are not good candle wax candidates alone, but when the individual components are combined at certain ratios, the resultant wax demonstrates low oil bleed despite a high oil-in-wax content, a smooth exterior finish, low sooting behavior and no wax tunneling. Furthermore, the wax consumption is reduced versus commercially available jar candle waxes.

In one aspect, the present disclosure provides a candle wax composition comprising a major amount of a foots oil and minor amount of a 600N slack wax. In another aspect, the present disclosure provides a candle wax formulation comprising a major amount of a 150N foots oil and minor amount of a 600N slack wax.

In certain embodiments, the composition comprises about 70% to about 80% of 150N foots oil and about 20% to 30% of 600N slack wax. In particular embodiments, the composition has an oil bleed less than about 100 mg (e.g., less than about 75 mg, less than about 50 mg, less than about 25 mg, or less than about 1 mg).

In an additional aspect, the disclosure provides items formed from the wax compositions as described herein. In certain embodiments, the wax items include a candle or a crayon. In a particular embodiment, the candle is a jar candle.

In an embodiment, the candle wax formulation of a jar candle comprises at least one of the following burning properties: a dropping point in a range of about 50° C. to about 58° C., a soot production in a range of about 400 to about 450 µg Soot/g wax, a melt pool depth of about 6 to about 14 mm (e.g., about 8 mm to about 12 mm), a flame height to melt pool ratio in a range of about 0.8 to about 1.2 (e.g., about 0.9 to about 1.1), and wax consumption per hour is about 1.8 to about 3 g/hour (e.g., about 2 to about 2.7 g/hour). In an embodiment, the melt pool depth and the flame height to melt pool ratio is based on a 4 hour burn cycle for the candle.

The present disclosure also provides a method of making a candle wax composition comprising the steps of: providing a major amount of a foots oil and minor amount of a 600N slack wax, heating the foots oil and the 600N slack wax to a temperature above the melting temperature of the foots oil and the 600N slack wax, blending the heated major amount of a foots oil and the minor amount of the 600N slack wax to form a homogenous heated composition, and cooling the homogenous heated composition to room temperature to form a candle wax composition.

Where applicable or not specifically disclaimed, any one of the embodiments described herein are contemplated to be able to combine with any other one or more embodiments, even though the embodiments are described under different aspects of the disclosure.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure.

DETAILED DESCRIPTION

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about" or "approximately" means an acceptable experimental error for a particular value as determined by one of ordinary skill in the art, which depends in part on how the value is measured or determined. All numerical values within the specification and the claims herein are modified by "about" or "approximately" the indicated value, and take into account experimental error and variations that would be expected by a person having ordinary skill in the art.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Petroleum waxes include waxes recovered by, e.g., the solvent dewaxing of waxy hydrocarbon oil streams as part of the petroleum refinery process including slack waxes and also includes hydrocracked waxes. Other petroleum waxes include waxy petroleum stocks such as waxy distillates, raffinates, petrolatum, microcrystalline waxes, etc. For example, paraffin wax is a white or colorless soft solid derivable from petroleum, coal or oil shale by distillation. The feedstock for paraffin wax is slack wax, which is a mixture of oil and wax. The lower the percentage of oil in the wax the more refined it is considered (semi-refined versus fully refined). The product wax may be further processed to remove colors and odors.

Paraffins (general formula $C_nH_{2n+2}$; wherein n=1 through 400) are a mixture of hydrocarbons containing from about 18 to about 60 carbon atoms per molecule. Paraffins can be arranged either in straight chains (i.e., normal or n-paraffins) or branched chains (i.e., isoparaffins). Longer-chain paraffins are major constituents of waxes. Lower molecular weight paraffins have a lower boiling point, while higher molecular weight paraffins have a higher boiling point. Therefore, separation of paraffins by the carbon number is possible.

Non-petroleum waxes include triglyceride waxes and other biobased waxes (e.g., tallow waxes, soy waxes and palm waxes).

Paraffin waxes are petroleum derived and primarily derived from solvent dewaxing of lubricant base stocks. After separation of lubricant base stocks, the waxes obtained are typically slack waxes having a high oil content of 5-50%. Slack waxes can be further deoiled to an oil content of 1-5% and will be called scale wax in that case or to less than 1% oil content and would be called fully refined paraffin wax in the latter case. Depending upon the distillation cut, these waxes could belong to any of the viscosity grades as described in Table 1 and thus could be a light, medium of heavy viscosity grade. Due to lower level of refining, slack waxes have a much lower market value than fully refined waxes.

TABLE 1

Comparison of Wax Viscosity and n-Paraffin Content.

| Grade (SUS) | % n-paraffins |
|---|---|
| 100-300 | 45-65 |
| 300-500 | 35-50 |
| 500-650 | 10-35 |
| 650-850 | 5-20 |
| 850+ | 0-10 |

As discussed earlier, light viscosity grade slack waxes typically have a higher n-paraffin content than heavy viscosity grades slack waxes and hence are preferred for use in wood and composite board coatings, since the industry perception is that higher n-paraffin content provides improved water repellency. One exception is oriented strand board construction/composite board application, where use of heavy neutral slack waxes is customary, because of use of higher processing plate temperatures, which necessitate the use of larger molecular weight waxes, which are less volatile.

Slack wax is a mixture of oil and wax, obtained from lubricating oil. Slack wax is the crude wax produced by chilling and solvent filter-pressing wax distillate. It serves as feedstock and that is further refined and blended to create value-added petroleum wax products. More specifically, slack wax is obtained by solvent dewaxing a waxy lube oil stock which produces a slurry comprising solid particles of wax and a mixture of dewaxed oil and solvent. This slurry is sent to solid-liquid separation means, such as a rotary drum filter, wherein the wax is deposited on the filter drum as a wax cake and the solution of dewaxed oil and solvent removed from the filter as a filtrate. The wax cake is washed with solvent while on the filter drum. The washed wax cake removed from the filter drum is known as "slack wax." This slack wax contains significant amounts of wax or waxy oil having a melting point broadly ranging from about 30 degree F. to 80 degree F., which is referred to as "foots oil" or "residue wax." It is necessary to remove the foots oil from the slack wax in order to produce a higher quality wax product having a higher melting point. Foots oil is the oil sweated out of slack wax and takes its name from the fact that it goes to the bottom, or foot, of the pan when sweated.

Crudes suitable for lubricant base stocks have a relatively high value. It is conventional to treat such crudes by subjecting them to atmospheric distillation followed by vacuum distillation from which the lube base stock boiling range cut is taken, solvent extracted, usually with furfural, and then solvent dewaxed, usually with methyl ethyl ketone or the like to produce a product which, upon filtration, is separated into a lubricant base stock and a wax. In order to further purify the wax fraction into a product of extremely high value, it is subjected to conventional deoiling from which a rather hard waxy product is recovered and from which a mixture of oil and soft wax by-product is also produced. This mixture of oil and soft wax is generally referred to as foots oils.

It is conventional to recycle the foots oil produced in this wax recovering process to a catalytic cracker of one sort or another, if such exists in the refinery in question, or, if possible, to sell the foots oil as cracker feed stock to another refinery. Another alternative is to degrade the foots oil into a heavy fuel oil fraction. This is probably the poorest of the alternatives from a monetary return point of view. The present disclosure has identified another useful and high value product (candle wax composition) that the foots oil may be utilized for.

Presently described are candle wax compositions and methods for making and using the same to improve the performance characteristics of candles and candle jars. More particularly, presently described are candle wax compositions and methods for making and using the same to improve oil bleed, provide a smooth exterior finish, and also provide low sooting and no wax tunneling when used in candles. The candle wax compositions disclosed herein include a combination of foots oil and slack wax. It was surprisingly and unexpectedly discovered that the individual components (foots oil and slack wax) used in the candle wax compositions disclosed herein are not good candle wax candidates alone, but when the individual components are combined, the resultant wax demonstrates low oil bleed despite a high oil-in-wax content, a smooth exterior finish, low sooting behavior and no wax tunneling. Furthermore, the wax consumption is reduced versus commercially available jar candle waxes. Foots oil, with as much as 40% oil, leads to excessive sooting upon burning. The high melting point of 600N slack waxes (>60° C.) results in unacceptable wax tunneling upon burning. When foots oil and slack wax are combined in appropriate proportions to form an inventive candle wax formulation, these waxes demonstrate low sooting behavior and no wax tunneling. Furthermore, the wax consumption is reduced versus commercially available jar candle waxes.

The candle wax formulation of the instant application provides similar and improved candle quality performance compared to candles produced from other paraffinic waxes. Moreover, the candle wax formulation of the instant application utilizes a stranded wax stream (foots oil) that is often times used as cat cracker feed in a refinery. The use of the foots oil in the candle wax formulation of the instant application upgrades the value of this typically low value wax and introduces additional wax volume into the marketplace for candle applications. The candle wax formulation disclosed herein provides a smooth candle wax that can find applications in the premium jar candle industry. The formulation also has superior oil bleed control which is unexpected and surprising given the high oil content of the parent foots oil and resultant wax blend. Despite the high oil content of the candle wax formulation disclosed herein, the burning behavior is comparable with premium candle waxes. Furthermore, the candle wax formulations disclosed herein burn at a lower wax consumption rate, which is advantageous for religious candles.

The evaluation of candle waxes requires both a qualitative and quantitative assessment. Candle appearance is the primary quality an end-user customer employs in the purchase of a finished candle product. As such, candles should have either a uniform smooth or non-smooth finish with no oil bleed on the candle surface. More specifically for jar candles, candle manufacturers evaluate whether a candle wax blend properly adheres to the sides of the glass jar and with no frosting or cracking of the wax surface. A quantitative evaluation of burn performance is conducted by candle manufacturers where minimal sooting and reasonable wax consumption are desired. Additionally candle manufacturers may assess melt pool formation (i.e. time to form full melt pool), melt pool depth and flame height; where ideally the ratio of flame height to melt pool should be 1.

The instant disclosure provides a candle wax formulation comprising a major amount of a foots oil and a minor amount of a slack wax. The foots oil may range from 100N to 200N, or from 125N to 175N with 150N being advantageous. The slack wax may range from 500 to 700N, or from 550 to 650N with 600N being advantageous.

The instant disclosure also provides a candle wax formulation comprising a major amount of a 150N foots oil and a minor amount of a 600N slack wax. In certain embodiments, the composition comprises about 70 to 80 wt % 150N foots oil and about 20 to 30 wt % 600N slack wax. In particular embodiments, the composition has an oil bleed less than about 100 mg (e.g., less than about 75 mg, less than about 50 mg, less than about 25 mg, or less than about 0 mg).

In an additional aspect, the disclosure provides items formed from the wax compositions as described herein. In certain embodiments, the wax items include a candle or a crayon. In a particular embodiment, the candle is a jar candle.

In an embodiment, the candle wax formulation of a jar candle comprises at least one of the following burning properties: a dropping point in a range of about 50° C. to about 58° C., a soot production in a range of about 400 to about 450 µg Soot/g wax, a melt pool depth of about 6 to about 14 mm (e.g., about 8 mm to about 12 mm), a flame height to melt pool ratio in a range of about 0.8 to about 1.2 (e.g., about 0.9 to about 1.1), and wax consumption per hour is about 1.8 to about 3 g/hour (e.g., about 2 to about 2.7 g/hour). In an embodiment, the above properties are based on a 4 hour burn cycle for the candle.

The candle wax formulations of the present disclosure provide superior performance in controlling oil bleed despite a high oil-in-wax content and achieve a smoother exterior finish. The individual components of the candle wax compositions of the present disclosure are not good candle wax candidates. This is because foots oil with as much as 40% oil has excessive sooting upon burning and the high melting point of 600N slack waxes (greater than 60° C.) result in wax tunneling upon burning, both of which are not favorable for candle jar wax formulations.

The candle jar wax compositions of the present disclosure have lower wax consumption versus currently utilized waxes. Furthermore the flame height to melt pool ratio of the candle jar was compositions of the present disclosure are at approximately the desired target value of 1. Although the degree of sooting is greater than the currently utilized waxes, the proposed wax blends have very low sooting behavior in comparison to many waxes currently available for candle applications. In fact, the candle jar was compositions of the present disclosure are on par with premium candle waxes, but sources from low value wax streams, e.g., stranded wax stream (foots oil).

In one particularly advantageous form, the candle wax composition disclosed herein includes a combination of a 150 N (solvent neutral 150 SUS viscosity) foots oil and a 600 N (solvent neutral 600 SUS viscosity) slack wax.

The candle wax composition includes a major amount of a foots oil. The amount of the foots oil in the composition may range from 55 to 95 wt %, or from 60 to 90 wt. %, or from 65 to 85 wt %, or from 70 to 80 wt %. In one preferred form, the candle wax composition includes from 70 to 80% of foots oil. In an even more preferred form, the candle wax composition includes from 70 to 80% of a 150 N foots oil (a high oil-in-wax soft wax product).

The candle wax composition includes a minor amount of a slack wax. The amount of the foots oil in the composition may range from 5 to 45 wt %, or from 10 to 40 wt. %, or from 15 to 35 wt %, or from 20 to 30 wt %. In one preferred form, the candle wax composition includes from 20 to 30% of slack wax. In an even more preferred form, the candle wax composition includes from 20 to 30% of a 600 N slack wax (high melt).

The candle wax composition may also include at least one coloring agent and/or at least one fragrance. The at least one coloring agent may be included in the candle wax composition at from 0.5 to 5 wt %, or from 1 to 4 wt %, or from 2 to 3 wt %. The at least one fragrance may be included in the candle wax composition at from 0.5 to 5 wt %, or from 1 to 4 wt %, or from 2 to 3 wt %.

The candle wax compositions disclosed herein including a majority of a foots oil with a minority of a high melt (for example 600 N) slack wax may have a dropping point ranging from 51 to 57 deg. C., or 52 to 56 deg. C., or 53 to 55 deg. C. The candle wax compositions disclosed herein including a majority of a foots oil with a minority of a high melt (for example 600 N) slack wax may have a dropping point of 51, or 52, or 53, or 54 or 55, or 56, or 57 deg. C.

The candle wax compositions disclosed herein including a majority of a foots oil with a minority of a high melt (for example 600 N) slack wax may have substantially no oil bleed on the candle surface. Substantially no oil bleed may be defined as less than 100 mg, or less than 50 mg, or less than 40 mg, or less than 30 mg, or less than 20 mg, or less than 10 mg, or less than 5 mg, or less than 2 mg, or less than 1 mg of oil bleed.

The candle wax compositions disclosed herein including a majority of a foots oil with a minority of a high melt (for example 600 N) slack wax yield a candle with a smooth surface appearance. In addition, in candle jar applications, the candle wax compositions disclosed herein including a majority of a foots oil with a minority of a high melt (for example 600 N) slack wax may yield excellent adherence to the side of the jar with no frosting and no cracking of the wax surface upon burning.

The candle wax compositions disclosed herein including a majority of a foots oil with a minority of a high melt (for example 600 N) slack wax may generate an amount of soot upon burning of between 400 and 500 µg soot/g wax, or 410 and 490 µg soot/g wax, 420 and 480 µg soot/g wax, 430 and 470 µg soot/g wax, 440 and 460 µg soot/g wax.

The candle wax compositions disclosed herein including a majority of a foots oil with a minority of a high melt (for example 600 N) slack wax may generate an amount of wax consumption upon burning of between 2.0 and 2.6 g/hour, or 2.1 and 2.5 g/hr, or 2.2 to 2.4 g/hr, or 2.3 and 2.4 g/hr.

The candle wax compositions disclosed herein including a majority of a foots oil with a minority of a high melt (for example 600 N) slack wax may generate a melt pool depth on burning of between 5 and 15 mm, or 6 to 14 mm, or 7 to 13 mm, or 8 to 12 mm, or 9 to 11 mm, or 10 to 11 mm.

The candle wax compositions disclosed herein including a majority of a foots oil with a minority of a high melt (for example 600 N) slack wax will not form wax tunnels when burned and will form a complete melt pool upon burning. More particularly, the candle wax compositions disclosed herein including a majority of a foots oil with a minority of a high melt (for example 600 N) slack wax may provide a flame height to melt pool depth on burning of between 0.5 and 1.5, or 0.6 to 1.4, or 0.7 to 1.3, or 0.8 to 1.2, or 0.9 to 1.1, or 1.0 to 1.1.

Methods of Making the Candle Wax Compositions

In an additional aspect, the disclosure provides methods of making the candle wax compositions as described herein.

The components of the candle wax compositions disclosed herein can be combined through various different processes known to those of skill in the art. By way of non-limiting example, the description provides a method of making the wax compositions as described herein according to the steps of admixing the wax components (600N slack wax and foots oil), melting and homogenizing the wax components by stirring and heating the mixture in a vessel at a temperature approximately 15° C. above the melting temperature of the higher melting wax, and optionally blending an optional additive, e.g., a coloring agent or fragrance, in the wax at a temperature of approximately 5 to 20° C. above the melt temperature of the wax composition with continuous stirring for sufficient time to fully dissolve the coloring agent and/or fragrance in the wax composition.

In certain embodiments, the method includes a step of admixing the 600N slack wax and the 150N foots oil as well as any additives (such as coloring agents and/or fragrances) and heating to a temperature sufficient to completely melt all components in the mixture while stirring.

In one form, the method of making the candle wax composition disclosed herein includes the steps of: providing a major amount of a foots oil and minor amount of a 600N slack wax, heating the foots oil and the 600N slack wax to a temperature above the melting temperature of the foots oil and the 600N slack wax, blending the heated major amount of a foots oil and the minor amount of the 600N slack wax to form a homogenous heated composition, and cooling the homogenous heated composition to room temperature to form a candle wax composition.

The method of making the candle wax composition may also include the step of adding one or more coloring agents, one or more fragrances or combinations thereof into the blending step. The one or more coloring agents may range from 0.5 to 5 wt % of the composition.

The one or more fragrances may also range from 0.5 to 5 wt % of the composition.

In a preferred form of the method of making the candle wax composition, the foots oil is a 150N foots oil and is included in the composition at from 70 to 80 wt % of the composition. In another preferred form of making the candle wax composition, the minor amount of the 600N slack wax ranges from 20 to 30 wt % of the composition.

The method of making the candle wax composition disclosed herein provides advantageous wax compositions with substantially no oil bleed on the surface, a smooth surface appearance, and a dropping point of from 50 to 58 deg. C.

The method of making the candle wax composition disclosed herein also provides wax compositions with improved burning properties in terms of soot production, wax consumption, melt pool depth and flame height.

The following non-limiting examples are provided to illustrate the disclosure.

EXAMPLES

Examination of Candle Jar Wax Formulations and Candle Jar Production.

Table 2 lists the physical properties, burning performance and candle appearance attributes of Reference Slack Waxes currently available and the parent waxes (Foots Oil and Parent Waxes 1 and 2) used in the wax formulations examined below. Parent waxes 1 and 2 are 600N slack waxes used in the inventive candle wax compositions disclosed herein. The Foots oil in Table 2 is a 150N foots oil used in the inventive candle wax compositions disclosed herein. Reference 1 and 2 slack waxes are lower melting relative to the Parent 1 and 2 slack waxes as seen by the differences in dropping point in Table 2.

Although the Reference Slack Waxes on their own are not smooth and demonstrate oil bleed; candle jar manufacturers often blend additional waxes to obtain a smooth finish where oil bleed is minimized. The reference waxes however have ideal melting points for jar candles, with reasonable wax consumption upon burning, and relatively low sooting. Tables 2-4 below list the dropping point for all waxes for consistency. 600N slack waxes (high melt) (shown as parent 1 and 2 in Table 2-4) and the resultant blends could not be measured by melting point, thus dropping point was used as an equivalent test. Comparative testing indicates only a marginal difference between the two determined values.

Table 2 depicts the individual properties of the waxes used in the inventive and comparative wax compositions. References 1 and 2 refer to lower melting slack waxes (for comparative wax compositions) and Parents 1 and 2 refer the high melt 600 N slack wax for use in the inventive wax compositions with foots oil.

TABLE 2

Reference and Parent Wax Properties

| | Oil in Wax (%) | Dropping Point (° C.) | % n-paraffins | Soot (ug Soot/g wax) | Wax Consumption (g/hr) | Oil Bleed | Melt Pool Depth (mm) | Appearance | Top Shrinkage | Flame Height: Melt Pool Depth |
|---|---|---|---|---|---|---|---|---|---|---|
| Reference 1 | 1 | 53 | 58 | 63 | 3.7 | Yes - droplets | 10.5 | Not Smooth | None | 1.4 |
| Reference 2 | 4 | 56 | 42 | 77 | 3.9 | Yes - droplets | 9.0 | Not Smooth | None | 1.7 |
| Foots Oil | 40 | 42 | 30-40 | 4400 | 3.0 | No | 50.0 | Not Smooth | None | 0.3 |

TABLE 2-continued

Reference and Parent Wax Properties

|  | Oil in Wax (%) | Dropping Point Point (° C.) | % n-paraffins | Soot (ug Soot/ g wax) | Wax Consumption (g/hr) | Oil Bleed | Melt Pool Depth (mm) | Appearance | Top Shrinkage | Flame Height: Melt Pool Depth |
| --- | --- | --- | --- | --- | --- | --- | --- | --- | --- | --- |
| Parent 1 | 15 | 67 | 38 | 262 | 2.5 | No | 0.0 | Smooth with frost | Cracks | unable to form melt pool |
| Parent 2 | 6 | 67 | 28 | 214 | 3.0 | No | 0.0 | Smooth with frost | Cracks | unable to form melt pool |

Individually, the parent waxes are not ideal jar candle waxes. Foots oil demonstrates good appearance properties, being both smooth and having no oil bleed, despite a very high oil content (candle customers generally expect good candle waxes to have less than 20% oil). It is in the burning evaluation that foots oil fails to succeed where most notably a significant amount of soot upon burning is generated (e.g., foots oil with as much as 40% oil has excessive sooting upon burning). Additionally, the low dropping point causes nearly the entirety of a 5 oz. candle to liquefy upon burning, which is not a desirable burning behavior. Parent waxes 1 and 2 are not ideal for smooth candles based solely on appearance. The exterior surface, although smooth, is found to have a significant degree of frosting where the wax has dis-adhered or delaminated from the glass jar. In addition, the wax cracks and partially tunnels on the top of the candle. Although Parent Waxes 1 and 2 appear to have reasonably low sooting this is attributed to the high dropping point that effectively impedes the waxes ability to form a complete melt pool. As a result these parent waxes demonstrated tunneling upon burning.

Foots Oil (a high oil-in-wax soft wax product) were combined with either Parent Wax 1 or 2 (comprising a high melt 600N slack wax) such that the majority of the formulation was composed of foots oil as shown in Table 3. The resulting wax products yielded smooth finished candle waxes demonstrating superior oil bleed control and excellent burning characteristics. In particular, 70 to 80 wt % foots oil was blended with 20 to 30 wt % parent wax 1 or 2 to form the inventive candle wax compositions. These wax formulations surprisingly and unexpectedly resulted in the desired melting point/dropping point targets of about 50° C. and about 57° C., respectively.

Table 3 highlights the physical properties and candle appearance attributes of wax blends comprising 80 wt % foots oil and 20 wt % of a specified paraffinic wax [Wax 'X']. The appearance properties of the wax formulations that utilized Parent Wax 1 and 2 in combination with foots oil are also shown in Table 3. As is shown in Table 3, Fully Refined Wax 1 and Slack Wax 1 were observed to yield oil bleed with varying severities. Additionally, the use of 20% Semi Refined Wax resulted in a non-smooth candle finish. Thus, these three wax blends were unable to meet the required candle wax appearance targets. Furthermore at the specified ratio, the dropping point was too low for a jar candle application. The percent n-paraffin content of Wax 'X' may negatively influence these properties whereby high n-paraffin content leads to either oil bleed or a non-smooth finish. Several waxes shown in Table 3 [Slack Wax 2 and Petrolatum] met the requirements for smooth finish with no oil bleed, including the candle jar wax formulations of the present disclosure. Additionally, these waxes at the specified ratio approximately met the desired low end melting point/dropping point target of 50° C. As shown in Table 3 below, the inventive wax compositions including 20 wt % of 600N slack wax (Parent 1 and 2) with 80 wt % foots oil yielded a smooth candle surface appearance with no oil bleed with a dropping point of the blend falling within the preferred range of 50 to 57 deg. C.

TABLE 3

Appearance properties for wax formulations containing 80% Foots oils.

|  | % n-paraffins in Wax 'X' | Dropping Point of blend (° C.) | Oil Bleed (mg) | Appearance | Optimum Range |
| --- | --- | --- | --- | --- | --- |
| Parent 1 | 38 | 52 | No | Smooth | >10% |
| Parent 2 | 28 | 51 | No | Smooth | >10% |
| Fully Refined Wax 1 | 80 | 44 | 1710 | Not Smooth | TBD |
| Fully Refined Wax 2 | 47 | 53 | TBD | Smooth | TBD |
| Petrolatum | 10 | 56 | No | Smooth but dark colour | TBD |
| Semi-Refined Wax | 66 | 46 | TBD | Not Smooth | TBD |
| Slack Wax 1 | 77 | 44 | 383 | Not Smooth | TBD |
| Slack Wax 2 | 26 | 49 | No | Smooth | TBD |

Table 4 below further demonstrates the burning characteristics of these wax blends at both 20 wt % and 30 wt % of Wax 'X'. At both 20 wt % and 30 wt % Wax 'X', Parent Waxes 1 and 2 (600N slack wax) demonstrate the least amount of sooting upon burning compared to low melt comparative Slack Wax 2 and Petrolatum. Increasing Wax 'X' from 20 wt % to 30 wt % increased the amount of soot when Slack Wax 2 and Petrolatum were combined with foots oil, while the amount of soot generated did not appreciably change when increasing the concentration of Parent Wax 1 or 2 (high melt 600N slack wax) from 20 wt % to 30 wt %. Although the wax consumption was generally found to be lower for wax blends using Slack Wax 2 and Petrolatum (versus Parent Waxes 1 and 2), the candle wax did not burn correctly; that is, the melt pool did not fully form in the 4 hour burn cycle consequently causing the candle wax to tunnel during burning. The only exception is Slack Wax 2 at 30 wt % in which the melt pool forms, however the wax blend had significantly more soot generated versus the wax formulation of the present disclosure.

Parent Waxes 1 and 2 (600N slack wax) were found to have lower wax consumption versus the Reference Waxes (waxes utilized in current candle jar wax formulation). This is advantageous for the customer whereby a specific burn time is a requirement for successful candle wax selection.

Furthermore the flame height to melt pool ratio was approximately the desired target value of 1. Although the degree of sooting was greater than the Reference Waxes, the proposed wax blends including 20 to 30 wt % 600N slack wax with 70 to 80 wt % foots oil have very low sooting behavior in comparison to many waxes currently available for candle applications and it is expected that the soot performance of these inventive candle wax composition will be competitive in the marketplace for candles, and candle jars.

TABLE 4

Burning properties for wax formulations containing 70% and 80% foots oil.

| | Dropping Point (° C.) | Soot (ug Soot/g wax) | Wax Consumption (g/hr) | Melt Pool Depth (mm) | Flame height: Melt Pool Depth | Burning Comments |
|---|---|---|---|---|---|---|
| 20% Parent 1 | 52 | 402 | 2.1 | 8.3 | 0.9 | |
| 20% Parent 2 | 51 | 466 | 2.2 | 8 | 0.8 | |
| 20% Petrolatum | 56 | 423 | 1.8 | 0 | Did not form | Candle did not fon melt pool completely, wax tunnels when burned |
| 20% Slack Wax 2 | 49 | 518 | 1.92 | 0 | Did not form | Candle did not form melt pool completely, wax tunnels when burned |
| 30% Parent 1 | 56 | 438 | 2.6 | 10 | 1.2 | |
| 30% Parent 2 | 57 | 433 | 2.4 | 12 | 1.2 | |
| 30% Perolatum | 64 | 922 | 1.6 | 0 | Did not form | Candle did not form melt pool completely, wax tunnels when burned |
| 30% Slack Wax 2 | 52 | 994 | 2.3 | 5 | 1.4 | |

While preferred embodiments of the disclosure have been shown and described herein, it will be understood that such embodiments are provided by way of example only. Numerous variations, changes and substitutions will occur to those skilled in the art without departing from the spirit of the disclosure. Accordingly, it is intended that the appended claims cover all such variations as fall within the spirit and scope of the disclosure.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A candle wax composition comprising a major amount of a 150N foots oil and a minor amount of a 600N slack wax.

2. The composition of claim 1, wherein the major amount of the 150N foots oil ranges from 70 to 80 wt % of the composition.

3. The composition of claim 2, wherein the minor amount of the 600N slack wax ranges from 20 to 30 wt % of the composition.

4. The composition of claim 3 further comprising one or more coloring agents, one or more fragrances, or combinations thereof.

5. The composition of claim 4, wherein the one or more coloring agents range from 0.5 to 5 wt % of the composition.

6. The composition of claim 4, wherein the one or more fragrances range from 0.5 to 5 wt % of the composition.

7. The composition of claim 3, wherein the composition has substantially no oil bleed on the surface.

8. The composition of claim 3, wherein the composition has a smooth surface appearance.

9. The composition of claim 3, wherein the composition has a dropping point of from 50 to 58 deg. C.

10. The composition of claim 3, wherein the composition upon burning yields a soot production ranging from 400 to 470 μg Soot/g wax.

11. The composition of claim 3, wherein the composition upon burning yields a melt pool depth ranging from 6 to 14 mm.

12. The composition of claim 3, wherein the composition upon burning yields a flame height to melt pool ratio in a range of 0.8 to 1.2.

13. The composition of claim 3, wherein the composition upon burning yields a wax consumption per hour of 2.0 to 2.7 g/hour.

14. A candle jar comprising the candle wax composition of claim 3.

15. The candle jar of claim 14, wherein the composition adheres to sides of the candle jar with substantially no frosting and substantially no cracking of the wax surface.

* * * * *